(12) United States Patent
Prasad et al.

(10) Patent No.: US 7,568,217 B1
(45) Date of Patent: Jul. 28, 2009

(54) METHOD AND APPARATUS FOR USING A ROLE BASED ACCESS CONTROL SYSTEM ON A NETWORK

(75) Inventors: Ranjan Prasad, Fremont, CA (US); Vinod Dashora, Mountain View, CA (US)

(73) Assignee: Cisco Technology, Inc., San Jose, CA (US)

( * ) Notice: Subject to any disclaimer, the term of this patent is extended or adjusted under 35 U.S.C. 154(b) by 616 days.

(21) Appl. No.: 10/394,289

(22) Filed: Mar. 20, 2003

(51) Int. Cl.
*G06F 15/16* (2006.01)
(52) U.S. Cl. ......................................................... 726/3
(58) Field of Classification Search .................. None
See application file for complete search history.

(56) References Cited

U.S. PATENT DOCUMENTS

| | | | | |
|---|---|---|---|---|
| 5,911,143 | A * | 6/1999 | Deinhart et al. | 707/103 R |
| 6,453,353 | B1 * | 9/2002 | Win et al. | 709/229 |
| 6,460,141 | B1 * | 10/2002 | Olden | 726/4 |
| 2003/0037263 | A1 * | 2/2003 | Kamat et al. | 713/202 |
| 2004/0162905 | A1 * | 8/2004 | Griffin et al. | 709/229 |

OTHER PUBLICATIONS

D. Richard Kuhn Mutual Exclusion of Roles as a Means of Implementing Separation of Duty in Role-Based Access Control Systems Second ACM Workshop on Role Based Access Control, 1997.*

Ferraiolo, David F., John F. Barkley and D. Richard Kuhn "A role-based access control model and reference implementation within a corporate intranet" ACM Transactions on Information and System Security vol. 2, No. 1 pp. 34-64, 1999.*
Botha et al. Separation of duties for access control enforcement in workflow environments 2001 IBM Systems Journal vol. 40, No. 3 pp. 666-682.*
Oh et al. Task-Role Based Access Control (T-RBAC): An Improved Access Control Model for Enterprise Environment 2000 Springer-Verlag Berlin Heidelberg DEXA 2000, LNCS 1873 pp. 264-273.*
David F. Ferraiolo, et al., "Proposed NIST Standard for Role-Based Access Control," Aug. 2001, ACM Transactions on Information and System Security, vol. 4, No. 3, pp. 224-274.
Brian Kropp, et al., "Case Study, Access to Cost Savings," *Information Security*, Apr. 2001, http://www.infosecuritymag.com/articles/april01/cover.shtml#case_study, printed Jul. 14, 2003, pp. 9-12.
Gail-Joon Ahn, et al., "The *RSL99* Language for Role-Based Separation of Duty Constraints," 1999, ACM, pp. 43-54.

* cited by examiner

*Primary Examiner*—Emmanuel L Moise
*Assistant Examiner*—David J Pearson
(74) *Attorney, Agent, or Firm*—Hickman Palermo Truong & Becker LLP (57) ABSTRACT

A role based access control system is described that assigns roles, which otherwise are mutually exclusive, to users based on detecting designated conditions when the user initiates actions or operations on the network. The assignment of the role to a particular user may be conditional upon one or more such designated conditions occurring. In particular, two roles that are mutually exclusive of one another may be occupied by one user for purpose of performing specified operations upon designated conditions being detected when the user initiates one or more of the specified operations. Business rules specify conditions for assigning the conditional roles.

39 Claims, 4 Drawing Sheets

METHOD AND APPARATUS FOR USING A ROLE BASED ACCESS CONTROL SYSTEM ON A NETWORK

FIELD OF THE INVENTION

The present invention generally relates to managing usage and access of resources on a network. The invention relates more specifically to method and apparatus for using a role based access control system on a network.

BACKGROUND OF THE INVENTION

Role based access control (RBAC) systems are gaining popularity as the methodology for choice for managing network privileges, access to network resources, and other security policies. RBAC systems assign roles to users or classes of users. Each role is defined by a class of occupants, and by actions that the class of occupants is allowed to perform in accessing and utilizing some or all of the resources on a network. Thus, in a RBAC system, the privileges (including network privileges, permissions to access protected resources, and privileges to perform actions) and authorizations of a particular user will depend on the role or roles that the user occupies.

For example, one user on a network may have only one role that corresponds to "employee". The role of "employee" provides the user with a certain set of privileges, including use of basic network resources, or the ability to perform certain employee functions. Another user may have two roles that correspond to "employee" and "manager". As a "manager", the second user may have access to network resources that are not available to the user that is only an "employee". Similarly, an "employee" who also has the role of an "administrator" may have the most privileges of anyone who can use the network.

Generally, RBAC systems are classified within four broad classes. RBAC0 systems are basic RBAC systems in which roles comprise a set of occupants and permissions. RBAC1 systems support hierarchies of roles; for example, the role Employee may include sub-roles Manager and Engineer. RBAC2 systems enforce principles of mutual exclusion or separation of duties. RBAC2 systems may provide for static mutual exclusion or dynamic mutual exclusion. RBAC3 systems combine the features of RBAC1 and RBAC2 systems.

One core concept that can be implemented through RBAC systems is separation of duties (SoD). The concept of SoD provides a security mechanism that protects a system of networked elements, including applications hosted by the networked elements, from the action of one user that is acting within that user's authorizations. For example, SoD may be used to limit the damage that one network user can cause through bad intent, negligence or oversight. To implement SoD, certain roles on the network are defined as mutually exclusive of other roles. SoD policies specify that users may not occupy roles that are mutually exclusive. A static SoD policy specifies that a user can never occupy two or more individual roles that are designated as "statically" mutually exclusive. A dynamic SoD policy specifies that a user can occupy two or more individual roles that are "dynamically" mutually exclusive, but the "dynamically" mutually exclusive roles cannot be occupied at the same time.

In past approaches, static and dynamic SoD policies are themselves defined statically. Thus, an administrator configures each role with either static SoD or dynamic SoD, and the specification does not change as an application runs. For example, an administrator may designate a set of roles that are statically mutually exclusive from one another, and another set of roles that are dynamically mutually exclusive from one another. For example, in a hypothetical business purchasing management application with SoD, given a "purchaser" role and a "purchase approver" role, one scenario provides that the administrator designates the two roles as statically exclusive, meaning that a user designated as being a "purchaser" can never be designated as a "purchase approver". Another scenario provides that the administrator designates the two roles as being dynamically exclusive, meaning that the user can occupy both "purchaser" and "purchase approver" roles, but never at the same time.

This type of static definition for roles can become inconvenient in certain business environments. In particular, the role assignments may be too inflexible for various situations presented in a given business environment. For example, in the "purchaser" and "purchase approver" example provided above, there is no simple mechanism for enabling a user to approve his own purchase of a few dollars. The additional approval required in the static scenario, or the additional time required for the user to switch roles in the dynamic scenario, are burdensome when considering the context that what is being requested is purchase approval authority of a few dollars. A business cannot readily delegate this authority on a case-by-case basis. Specifically, a business cannot automate delegation of this authority on a case-by-case basis.

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

A method and apparatus for using an RBAC system on a network is described. In particular, an embodiment describes using an RBAC system in accessing and operating resources executing on a combination of networked elements. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Embodiments are described herein according to the following outline:
1.0 GENERAL OVERVIEW
1.1 TERMINOLOGY
1.2 GENERAL DESCRIPTION
2.0 SYSTEM OVERVIEW
3.0 CONDITIONAL ROLE DESCRIPTIONS
4.0 METHOD FOR IMPLEMENTING CONDITIONAL ROLES
5.0 IMPLEMENTATION MECHANISMS—HARDWARE OVERVIEW

1.0 GENERAL OVERVIEW

Embodiments of the invention provide for assigning roles to users of a network based on the occurrence of a condition during the user's session. In one embodiment, users of a particular class on a network may be assigned one or more roles based on conditions that occur during the user's interaction with the network. In another embodiment, two of the roles available on the network can be mutually assigned to a user only if a particular condition occurs during the user's network session. Otherwise, the two roles are treated as mutually exclusive, meaning that the user cannot occupy both roles at the same time.

1.1 Terminology

An "administrative policy engine" refers to an engine that administers policies on a managed network. The engine includes software, hardware, firmware, or combination thereof, which executes one or more processes for administering the policies.

The term "resource" includes applications, logic, data provided on a network, as well as the handling of an operation. A protected operation involves resources for performing a network action, such as "configure router", or an application specific action, such as "stop printer". Other examples of a resource includes an interface on a router or a file in a file system.

A "role" refers to a class of users that are assigned a set of privileges on the network. The privileges may control or otherwise manage access of the network resources. A role is said to be "conditional" if it can be assigned to a particular user upon a condition occurring during a user's network session.

A user is said to "occupy" a role if the role has been assigned to the user.

A user is said to "mutually occupy" two roles if the user is assigned to two roles at the same time.

1.2 General Description

According to an embodiment, a method is provided for applying an RBAC system on a network. The method includes detecting that a user has initiated an operation that requires access to a resource on the network during a network session. A condition specified by the operation is identified. A determination is made, based on the condition, as to whether a role is to be assigned to the user based on detection of the condition. A privilege required to perform the operation may be defined by the conditional role assigned to the user.

In another embodiment, an operation initiated by a user is detected. A set of rules are identified, where the set of rules have been designated for the user initiating the operation. A determination is made as to whether a user can mutually occupy two roles, where one of the roles has already been assigned to the user, and another one of the roles is required to be assigned to the user in order for the user to perform the operation. The outcome of the determination is based on the set of rules. The user can perform the operation if the outcome of the determination is that the user can be assigned the second role. Absent a determination to the contrary, the two roles are treated as being mutually exclusive of one another.

In one embodiment, a user token is established at the beginning of a session. The token may contain, among other data, the roles the user occupies for that session. The roles are organized into broad categories. One set of roles may be static and last the duration of the user's session. Another set of roles may be based on actions that are performed by the user. Such roles may be dynamic and/or conditional. A user that is permitted to occupy such roles may or may not actually occupy the roles in a given session. A role occupancy determination may be based on business rules. For example, multiple sets of "mutually exclusive" roles may exist in a given user session and each such set may have associated with it business rules that determine the conditions under which the role occupancy can be granted to the user.

In another embodiment, a set of conditions is designated, where each condition may be identified from a user initiating an operation using resources available in the network. One or more roles that the user may occupy are determined by correlating one or more conditions that are identifiable from the operation with one or more roles that control access to resources on the network. Based on the one or more conditions, the determination is made as to whether the user can mutually occupy a first role that is assigned to user prior to the user initiating the operation, and a second role required to perform the operation. Unless the one or more conditions occur, the two roles are mutually exclusive of one another. In other words, the user can occupy either one or the other role, unless the one or more conditions occur, in which case both roles can be occupied at the same time.

Embodiments of the invention enable roles to be assigned to users on an operation-by-operation basis. A network administrator or other appropriate user may configure specific instances or conditions when a particular role is to be assigned to a user. The result is that roles can be assigned to users dynamically. The assignment of roles may be set based on the specifications and configurations of the administrators of the network. Furthermore, the roles may be assigned after the user starts a network session. For instance, the user may "switch" to administrator mode for a short duration to perform some administrative tasks and then revert back to "user roles" without having to logout and login again Moreover, roles that are designated to be mutually exclusive of one another may be dynamically assigned to the same user for select operations. In other words, mutually exclusive roles do not have to be statically configured to be exclusive of one another. Rather, mutually exclusive roles may be assigned to the same user in order to create more flexibility in the manner SoD security policies are implemented on a network.

2.0 SYSTEM OVERVIEW

Figure 1:
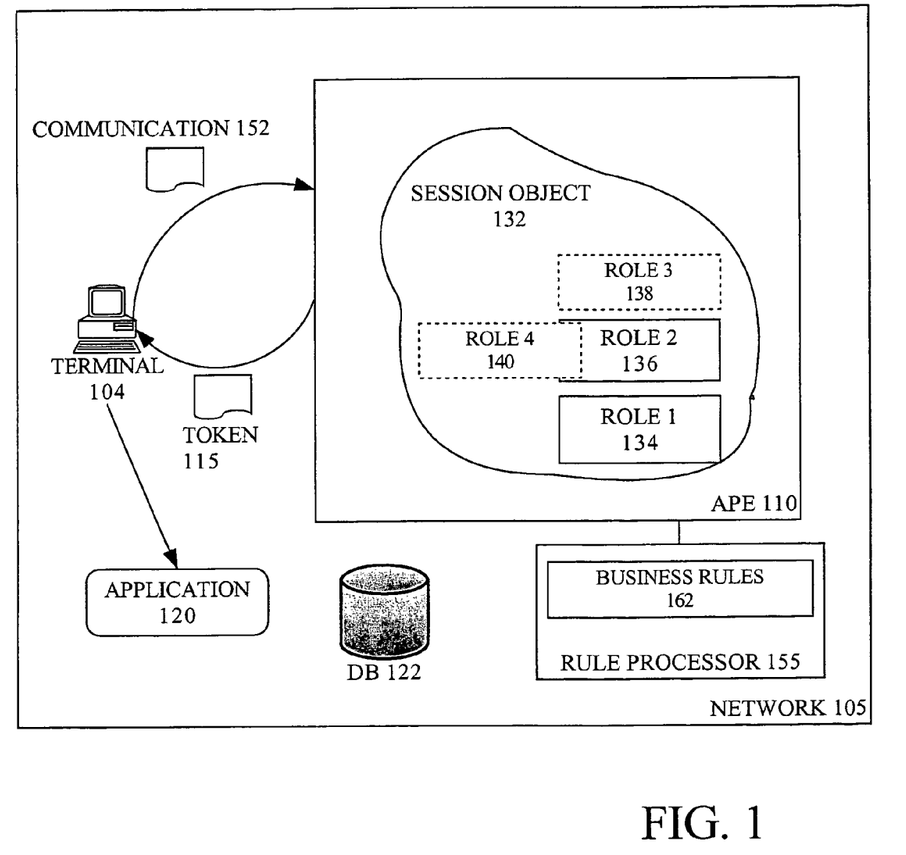
FIG. 1 illustrates an implementation of an RBAC system.

FIG. 1 illustrates an implementation of an RBAC system. A policy engine 110 is provided on a network 105 to implement and manage the RBAC system. A terminal 104 provides an interface for a user to utilize resources of network 105.

The RBAC system may be implemented to manage privileges of users of the network 105. In particular, the RBAC system may be implemented to select classes of users that are permitted to access and/or use certain resources on the network. In the example provided by FIG. 1, access to an application 120 and a database 122 is managed through the RBAC system. Other examples of network resources that can be made subject to the RBAC system include other applications or middleware, memory or other hardware components, and communication channels such as virtual private networks. The RBAC system may also control access and use of administrative resources on the network, which are of particular interest when SoD policies are implemented. Such resources may include, for example, network managers and domain managers.

The policy engine 110 manages access and/or use of resources on the network by assigning roles to classes of users on the network 105. The roles govern the access and/or use of the network resources by the users. For example, access and/or use of the administrative resources may be regulated for a class of users that are designated the role of "administrator". In one embodiment, policy engine 110 is independent of application 120 and database 122 and its functions are invoked by the application or database using an API, remote procedure call, remote method invocation, or other calling mechanism. In other embodiments, policy engine 110 may be integrated into application 120 or database 122.

When a user initiates a network session, the user is authenticated. Under one authentication scheme, the user is authenticated using a login or user-identification, and usually a password. Once authentication is complete, a session object 132 is created that specifies the authorizations or privileges of the user. The session object 132 identifies the roles assigned to the user for the particular session. The privileges defined by the roles determine what resources the user is permitted to access and/or use. Thus, roles may be determined dynamically at runtime using the session object 132, rather than statically as in prior approaches.

In an example shown by FIG. 1, once the session object 132 is created, the user is assigned a first role 134 and a second role 136. As explained in more detail below (see FIG. 2A and FIG. 2B) the first role 134 and second role 136 may have hierarchical relationships with one another. Alternatively, the first role 134 and the second role 136 may be defined as mutually exclusive of one another. In one scenario, the first role 134 may correspond to a common role shared by all network users, while the second role 136 may be associated with a subset of all the users. For example, the first role 134 may correspond to that class of users known as "employee," and the second role 136 may correspond to the class of users known as "manager". The privileges provided to the class of users that have the "manager" role may exceed the privileges provided to users that have only the "employee" role. The second role 136 also could be an "administrator" role with privileges greater than the "manager" role.

The roles assigned to the user in the session object 132 determine the user's access to specific resources on the network 105. Specific examples of how roles may be applied are provided in the Appendix. For example, the user may not be given access to certain applications if the user is not an "administrator." According to an embodiment, the user's ability to perform certain operations also depends on what roles the user occupies. For example, application 120 may correspond to an administrative application for managing business purchases. In that scenario, if the user wants to perform operations using application 120, the session object 132 may need to identify "administrator" as one of the roles that the user occupies in order for the use to be able to perform the operation.

According to an embodiment, the roles that the user may occupy during the network session, and that are identified in session object 132, are conditionally assignable to the user. In particular, a role may be assigned to the user in response to the user initiating one or more actions or operations. In an embodiment such as illustrated by FIG. 1, a conditional role 138 is assigned to a user upon the occurrence of a designated condition. The designated condition may be specified in a rule that is evaluated when the session object 132 is created. The designated condition may correspond to a feature or object contained in the action or operation initiated by the user. The conditional role 138 may also require the user to be in a particular class of users. For example, the conditional role 138 may be an additional role that only "managers" can occupy.

In an embodiment, certain roles may be conditional in that they are designated as mutually exclusive of another role, unless a condition occurs. Once the condition occurs, a user may occupy both of the otherwise mutually exclusive roles. In an embodiment described by FIG. 1, a conditionally exclusive role 140 is provided that, for purpose of illustration, is assumed to be mutually exclusive of the second role 136, unless a condition occurs in which case the user can occupy both roles.

In this arrangement, the condition may correspond to a feature or object of an action or operation initiated by the user during the user's session. For example, for a user to complete a particular operation, the user may be required to occupy the conditionally exclusive role 140. In one embodiment, if the particular operation contains a designated condition, the user is permitted to occupy both the second role 136 and the conditionally exclusive role 140. Once the user occupies the conditionally exclusive role 140, the policy engine 110 enables the user to complete the operation. For example, policy engine 110 informs application 120 or database 122 that the user may complete the operation. Alternatively, the policy engine 110 responds to an application query of whether the user can perform a task. For example, the policy engine 110 may answer that a particular user can perform a stated task in response to an application query asking whether the user should be permitted to perform the stated task. Still further, policy engine 110 enables the user to perform some other action or operation that was previously not possible without the assignment of the conditionally exclusive role 140.

Several mechanisms and techniques may be used to assign a conditional role to the user in response to the user initiating a corresponding operation. In one embodiment, one or more roles are dynamically assigned to users at run-time. For example, roles are assigned to the user after the user has logged in and begun interacting with the network, at the same time or after session object 132 is created.

In one approach, when the user is engaged in a network session, the user may send a message, call or other communication 152 to policy engine 110. Alternatively, the user may send the communication 152 to application 120 or database 122. The communication 152 may correspond to a request or initiation to perform an operation that accesses or uses application 120, database 122, or other network resources. The communication 152 may be directed or forwarded to policy engine 110 in order to determine whether the user can perform the requested operation (by being assigned a corresponding one of the conditionally assignable roles). For example, communication 152 may be directed to policy engine 110 through intermediate network components of network 105. Alternatively, the application 120 or database 122 may redirect the communication 152 to the policy engine 110 in order to determine whether the particular user is allowed to perform the requested operation.

The policy engine 110 evaluates the communication 152 in order to detect one or more designated conditions. In an embodiment, the designated conditions may be in the form of data or objects that are contained within the initiation of the operation. Alternatively, communication 152 may identify the operation that the user is requesting, and may provide one or more attribute values from which the designated conditions may be inferred.

In an embodiment, if a designated condition is detected, the policy engine 110 matches the condition to one or more business rules 162. In one embodiment, a rule processor 155 manages business rules 162 and correlates a set of business rules to the identified conditions. In one embodiment, the rule processor 155 and the business rules 162 are part of the policy engine 110. The policy engine 110 and/or rule processor 155 evaluate the business rules 162 in order to identify one or more rules that correlate to the identified condition. The policy engine 110 then identifies what new or additional role is to be assigned to the user based on evaluating the identified business rules. The ability of the user to perform the operation specified by the communication 152 depends on what role is assigned to the user as a result of the designated condition occurring. In the example provided, the user is assigned the conditionally exclusive role 140 despite already having been assigned the second role 136. An operation requiring privileges of the conditionally exclusive role 140 can then be performed.

In an embodiment, the set of rules 162 is configured by users and vendors of the network 105. The individual rules may be defined by a condition, and a set of privileges and/or permissible actions that define or distinguish a class of the network users. The set of rules 162 may be configured, modified, and developed at design-time. In this context, design-time is any time before rules 162 are used or evaluated for purposes of determining which rules apply to a user.

If the user is assigned a role that permits performance of operation 152, an instruction may be sent from the policy engine 110 to enable an application to allow the user to perform an operation. This instruction may be sent in response to a request from that application. The terminal 104 may use the token 115 for subsequent access to application 120 (or database 122). Alternatively, the policy engine 110 may configure or instruct the application 120 or database 122 to provide access or otherwise enable the operation 152. An example of how a token may be constructed is provided in the Appendix.

In another embodiment, the dynamic assignment of roles that a particular class of user may occupy may be designated at design-time. Instructions specifying the possible roles, as well as the conditions that may trigger the possible roles to be assigned to the user during a network session, may be configured prior to users initiating network sessions. The instructions may be distributed from policy engine 110 to other network management components, applications that implement SoD policies, or to the user's terminal 104. For example, a policy server that maintains the session object 132 of a particular user may also be provided with instructions that specify all of the possible roles that the user may occupy, as well as the conditions in which particular roles are to be assigned.

3.0 CONDITIONAL ROLE DESCRIPTIONS

Figure 2A:
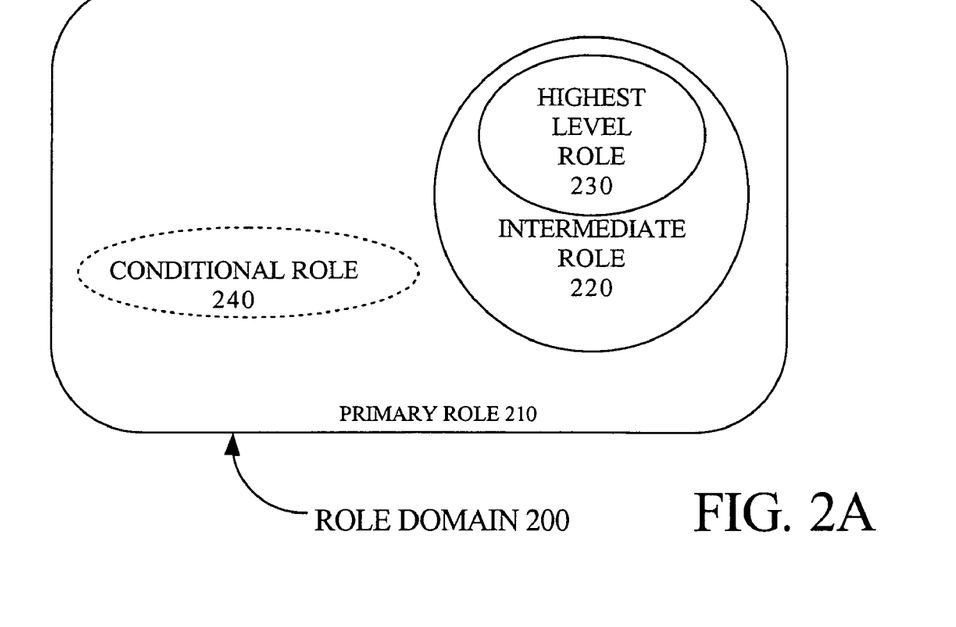
FIG. 2A illustrates an embodiment where a role is conditionally assignable to a class of users on a network.
Figure 2B:
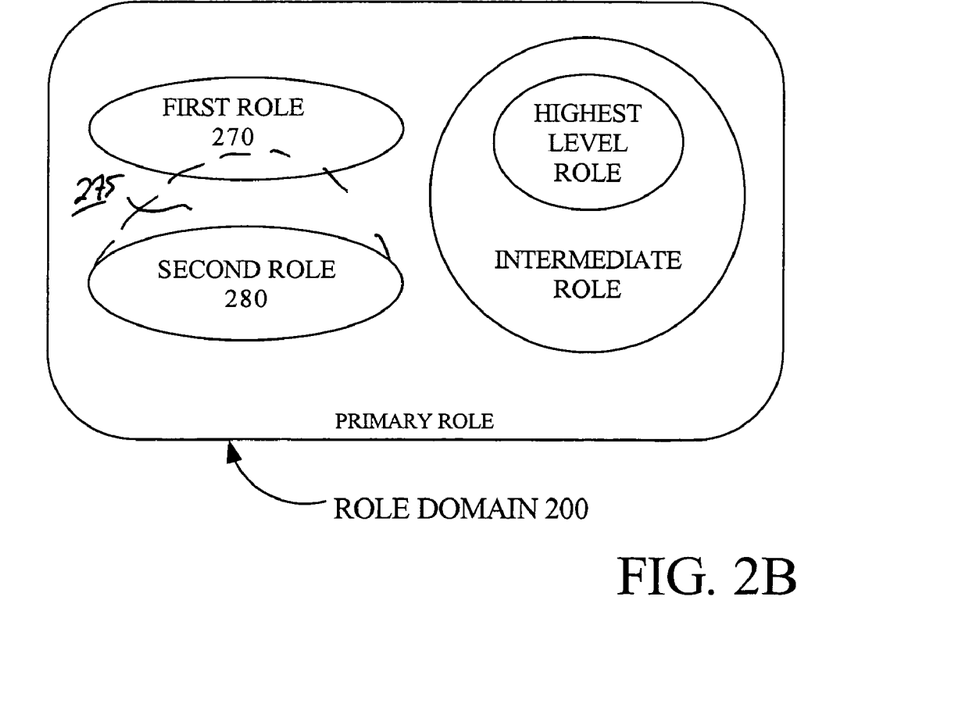
FIG. 2B illustrates an embodiment where two (or more) roles are mutually assignable to individuals in a class of users only if a particular condition occurs.

FIG. 2A and FIG. 2B illustrate roles that can be dynamically defined for classes of users based on the occurrence of designated conditions. The roles that can be assigned to individuals may be defined in part by hierarchical relationships, and exclusivity relationships, or non-exclusivity relationships with other roles.

According to certain embodiments, one or more roles can be dynamically defined for individuals in a particular class of users based on the occurrence of one or more designated conditions. Such dynamically defined roles are said to be conditionally assignable, in that the roles are assigned to individuals in a particular class when a designated condition occurs. The designated conditions that affect the assignment of a conditionally assignable role may include events that occur when a user initiates or attempts to perform an operation. The performance or completion of such an operation may require a new privilege to be provided to the user by the conditionally assignable role. The user, or an associated application or resource, may be permitted or enabled to complete the operation when the user is assigned the conditional role. Otherwise, the user is precluded from performing the operation.

FIG. 2A illustrates an embodiment where a role is conditionally assignable to a class of users on a network. All of the roles that may be defined to exist for a system may be said to comprise the role domain 200 for a network. In the example provided, the role domain 200 may include a primary role 210 that has, as its class of users, all users of the network. A common set of privileges for accessing network resources may be designated to the primary role 210. For example, the primary role may correspond to the user class "employee", and each user of the network may be an employee that occupies the "employee" role. A set of privileges may be designated for the "employee" role. The specific privileges used may vary in different implementations.

One or more intermediate roles 220 may be assigned to subsets of users that occupy the primary role 210. In the example provided, each user that is a member of one of the intermediate roles 220 is also a member of the primary role 210. Thus, each user that is a member of one of the intermediate roles 220 has the privileges of a member in the primary role 210, and additional privileges defined for that intermediate role 220. For this reason, the intermediate roles 220 are said to have a higher hierarchical level than the primary role 210. To further the example provided, the intermediate roles may correspond to users of the role "manager". The users of the role "manager" also belong to the class for the role of "employee", but not all occupants of the "employee" role also occupy the "manager" role.

Additional hierarchical roles may be defined. For example, a highest level role 230 may correspond to an "administrator" who has unlimited access to the network resources. Thus, the occupant of the "administrator" role may have privileges of the "manager" role and of the "employee" role. Countless other variations of different roles and applications to classes of users are possible.

In this context, an embodiment provides for designating conditionally assignable roles to a class of users based on operations that are initiated or performed by those users. FIG. 2A illustrates a conditional role 240 that is assigned to individual users of a particular class based on the occurrence of a condition. According to one embodiment, a member of a particular class of users may be assigned the conditional role 240 if that member attempts or initiates an operation that causes a designated event to trigger assignment of the conditional role 240. In an example described with FIG. 2A, the conditional role 240 is a subset of the primary role 210. However, other variations are possible. For example, the conditional role 240 may be an alternative to the primary role 210. Alternatively, in the example provided, the conditional role 240 may be a subset of one of the higher level roles.

To provide an example, the conditional role 240 may correspond to a class of users termed "purchasers". An "employee" may submit a purchase order if the "employee" is also assigned the role of "purchaser". According to an embodiment such as described in FIG. 2A, the employee is assigned the conditional role 240 if, for example, he submits a purchase order for a designated item. In this example, the condition that triggers the assignment of conditional role 240 may be a purchase order that specifies the designated item, or the particular user or class of user specifying a type of item. The user may attempt to submit the purchase order in order to trigger assignment of the conditional role 240. Once the conditional role 240 is assigned, the user may complete the operation of submitting the purchase order. If the conditional role 240 is not assigned, the user may not be allowed to submit the purchase order.

FIG. 2B illustrates an embodiment where two (or more) roles are mutually assignable to individuals in a class of users only if a particular condition occurs. In an embodiment such as described, the occurrence of the condition enables the user of the particular class of users to mutually occupy both roles that were otherwise mutually exclusive of one another. Thus, two roles are dynamically defined to be exclusive of another, so that the definition of the roles allows for the roles to be mutually occupied by one user upon the occurrence of a designated condition.

In an example provided by FIG. 2B, the role domain of the network may include a first role 270 and a second role 280 that can only be mutually occupied by a user when a designated condition occurs. Absent the occurrence of the designated condition, the first role 270 and the second role 280 are treated as being mutually exclusive of one another. When the two roles are mutually exclusive, a user can be assigned to one role, but not the other. Upon occurrence of a designated condition, the user may be assigned both the first role 270 and the second role 280 for purposes of performing the operation that triggered the condition. In one embodiment, the user may hold both roles for a duration in which the condition holds true. The user's ability to occupy both roles is shown by the shaded intersection 275. Alternatively, the user may be able to occupy both roles only until the occurrence of another condition, such as the user logging-off, or requesting to perform another operation.

To provide an example, a user of a particular class (e.g. "employee") may also be assigned the first role 270, which corresponds to "purchaser". The role of "purchaser" may be mutually exclusive of the role of "purchase approver", which corresponds to the second role 280. This type of separation of duties provides some security in that it precludes an employee from approving his own purchases. According to an embodiment, the mutual exclusivity of the "purchaser" and "purchase approver" roles may be removed if a designated condition occurs. For example, the designated condition may correspond to submitting a purchase order that requests the purchase of an item that is less than $50. When that happens, the person assigned the "purchaser" role may also be assigned the "purchase approver" role so that he can approve his own purchase. Thus, while there is benefit in ensuring that duties and privileges of "purchaser" and "purchase approver" are separated, there is also benefit in removing the separation of duties requirements for the two roles in certain conditions, such as when the purchase amount is below a certain threshold. One of the business rules 162 may express the foregoing condition and result.

With embodiments described herein, the particular condition that triggers the conditional assignment of a role may be provided through use of business rules. For example, a business rule may trigger the assignment of the conditional role 240 in FIG. 2A to a user of a particular class. Another business rule may provide that one user may occupy both the first role 270 and the second role 280 upon the occurrence of a condition.

As described with FIG. 2A and FIG. 2B, a manager or operator of the network may draft or otherwise configure business rules so that conditional role assignments may be implemented in a desired manner. In one embodiment, a user initiates an operation using a data object, such as a purchase order. With reference to an embodiment such as illustrated by FIG. 1, policy engine 110 inspects the operation and identifies the data object. The data object is compared to a list of business rules, such as provided by the rule processor 155. A rule that designates the object is identified. That rule may specify a role or a privilege. The policy engine 110 will assign the role specified by that rule to the user in response to the user initiating the operation. Because the user is assigned the role, the user is permitted to complete the operation. The operation can be completed using resources that are protected on the network from users that do not have the designated role for accessing or using that resource.

4.0 METHOD FOR IMPLEMENTING CONDITIONAL ROLES

Figure 3:
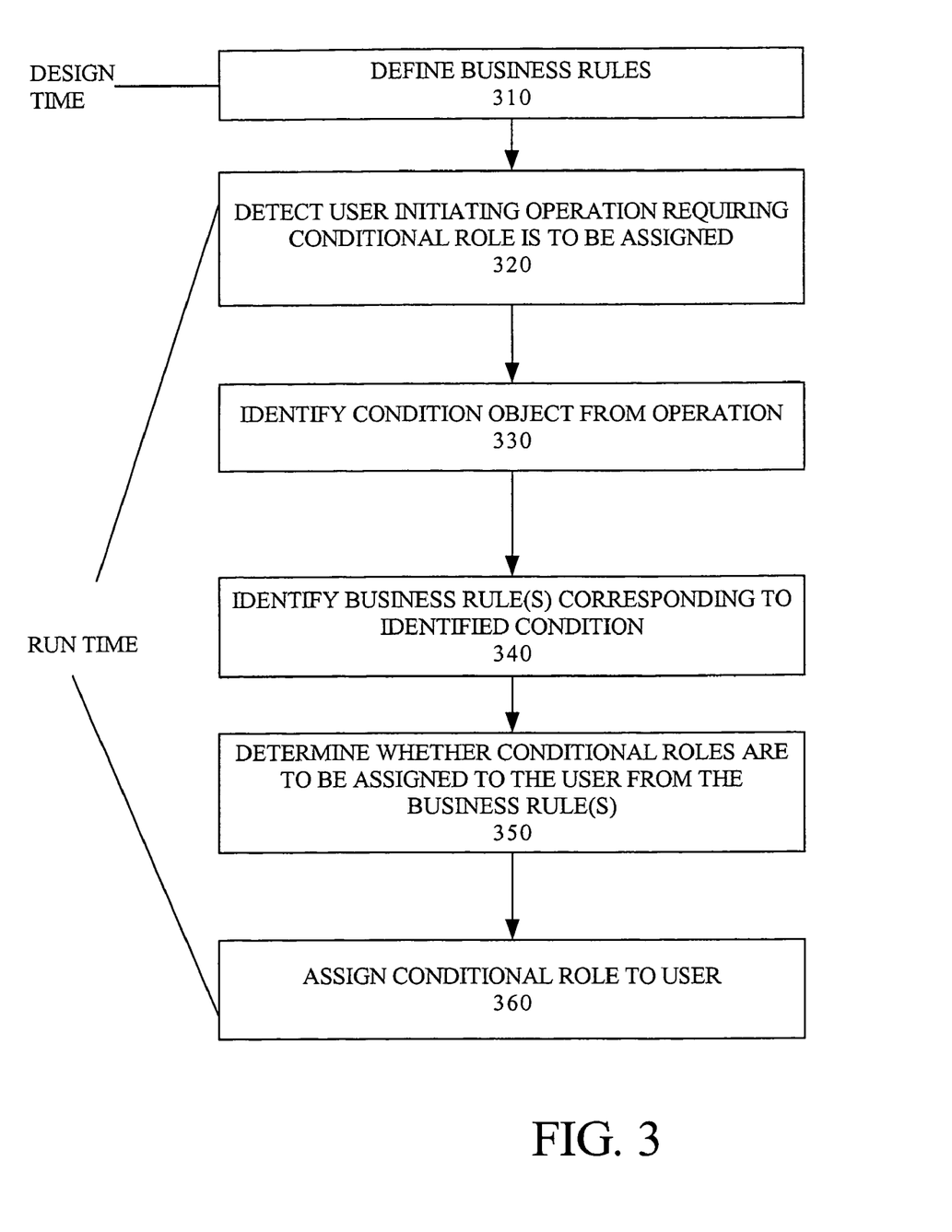
FIG. 3 illustrates a method for implementing conditional roles in a RBAC system.

FIG. 3 illustrates a method for implementing conditional roles in a RBAC system. The method may be implemented using a RBAC system such as described above with FIG. 1. Reference to numerals of FIG. 1 is intended to illustrate suitable components for implementing a method such as described. Although the embodiment of FIG. 1 is described in this section for purposes of providing a clear example, alternatively, steps of FIG. 3 may be implemented using one or more computer programs, other software elements, hardware elements, or a combination thereof, within an application program, middleware, operating system, or other functional element.

In step 310, business rules are defined that designate conditional roles. Each business rule may specify one or more conditions that trigger execution of the rule, and the conditional role (or roles) that are assigned to a user when the specified conditions are detected. In addition, each business rule may specify the actions, operations and/or privileges that are provided to a user who is assigned the specified role.

In an embodiment, step 310 is performed at design-time. At design-time, all business rules may be specified, and associations between business rules and conditional roles may be made. The conditions that trigger select business rules are also specified at design time.

Later, a user may login and establish a session. Alternatively, a user may request a protected resource, in which case the user may be prompted to login.

When a user is logged in, step 320 provides that an operation initiated by a user that requires assignment of a conditional role is detected. In an RBAC system, a user may specify an object or data structure when initiating performance of an operation. For example, a user that is an "employee" may submit a purchase order as an attempted operation, and the purchase order submission may not be completed unless the user is also assigned the "purchaser" role. The "purchaser" role may be conditionally assigned to the particular user.

Initiation of the operation may correspond to a request to perform the operation, or even partial performance of the operation. The policy engine 110 may detect the user initiating the operation through various mechanisms. For example, the resource that is the subject of the user's operation may request from the policy engine 110 whether the user can perform the stated operation. Completion of the operation may depend on the response from the policy engine 110, which will be based on determination of role assignments. In another embodiment, the user's terminal 104 may forward a request to perform the operation to policy engine 110. Alternatively, the resource that is being accessed or used may forward the user's request to policy engine 110. Still further, one or more intermediate management components may forward the user's request to perform the operation.

Step 330 provides that a condition is identified from the operation that permits the assignment of the conditional role to the user. Alternatively, the role assignment conditions and rules may be in the session object or the token. In an embodiment, the condition may be a data object identified in the attempted operation. In the example provided, submission of the purchase order may correspond to the occurrence of the condition.

In step 340, any business rules that correlate to the identified condition are identified. The rule processor 155 may be used to determine which, if any, of the business rules correlate to the identified condition.

Step 350 provides that the conditional assignment of roles is determined from the identified business rules. In one embodiment, a role is conditionally assignable to the user only if a corresponding condition is identified from the user initiating the operation. In another embodiment, the conditional role that is to be assigned to the user is one that is otherwise mutually exclusive of another role that the user is occupying when initiating the operation. The occurrence of the condition enables the user to mutually occupy the two roles at one time, even though the two roles are mutually exclusive of one another absent the condition occurring.

Step 360 provides that the identified conditional role is assigned to the user. In one embodiment, the user can complete the operation that triggered the assignment only upon the conditional role being assigned. The conditional role may be unassigned once the triggering operation is completed. The assignment may be in effect as long as the condition is true. In another embodiment, the user is assigned the conditional role for one or more subsequent actions or operations.

In addition to examples provided above, some applications for an embodiment such as described in FIG. 3 are provided as follows. A user may initiate an administrator operation. For example, the user may seek access to a domain manager. Even though the user may be identified as an administrator, the user may not be assigned the particular administrator role that is needed to perform operations with the domain manager. The condition that may be needed for the user to perform the initiated operation is that the user must be working at a designated secure station. The required administrator role is assigned to the user after the user has initiated the session and initiated the domain manager operation, but only if the user has initiated the operation from one of the secure stations. Additionally, the conditional administrator role may be assigned automatically to the user upon occurrence of the condition (the user initiating the administrator operation from the secure station), and the operation(s) that require the particular role may be performed without noticeable interruption.

Another example is where two roles are conditionally mutually exclusive. For example, in order to implement SoD amongst administrators, a first administrator role may be the only role that permits a class of administrators to access archive records, and a second administrator role may permit another class of administrators to access personnel records, but not archives. The first administrator role and the second administrative role may be conditionally mutually exclusive of one another. For example, a member in the class of the first administrator role may not be assigned the second administrator role unless the member initiates an operation to access his own personnel records. The second administrator role may be assigned to the member of the first administrator role upon that member initiating an operation to read his personnel record. The duration in which the second administrator role is assigned to that member may be the duration until the triggering operation is completed.

Likewise, a member of the class of the second administrator role may be excluded from the first administrator role unless that member attempts an operation to access his own archive records. Upon such a condition occurring (a member of the class of the second administrative role requesting access to his own archives), the member of the class of the second administrative role is also assigned the first administrative role for purpose of completing the operation to access his own archives. The member may be re-assigned out of the first administrative role upon completing the operation.

As indicated in FIG. 3, one embodiment provides for performing the step of designating business rules at design-time. The remaining steps of a method as described in FIG. 3 may be performed at run-time, such as when users of the network conduct network sessions. In other embodiments, however, additional steps of a method such as described in FIG. 3 may be performed at design-time. For example, instructions specifying conditions that would trigger a user to be assigned a conditional role, and correlating business rules that specify the conditional roles, may be transferred by the policy engine 110 (FIG. 1) to components of the network prior to a particular user initiates a network session. Components of the network may then use the instructions to determine whether the user can be assigned a particular role for purpose of performing an operation.

5.0 IMPLEMENTATION MECHANISMS

Hardware Overview

Figure 4:
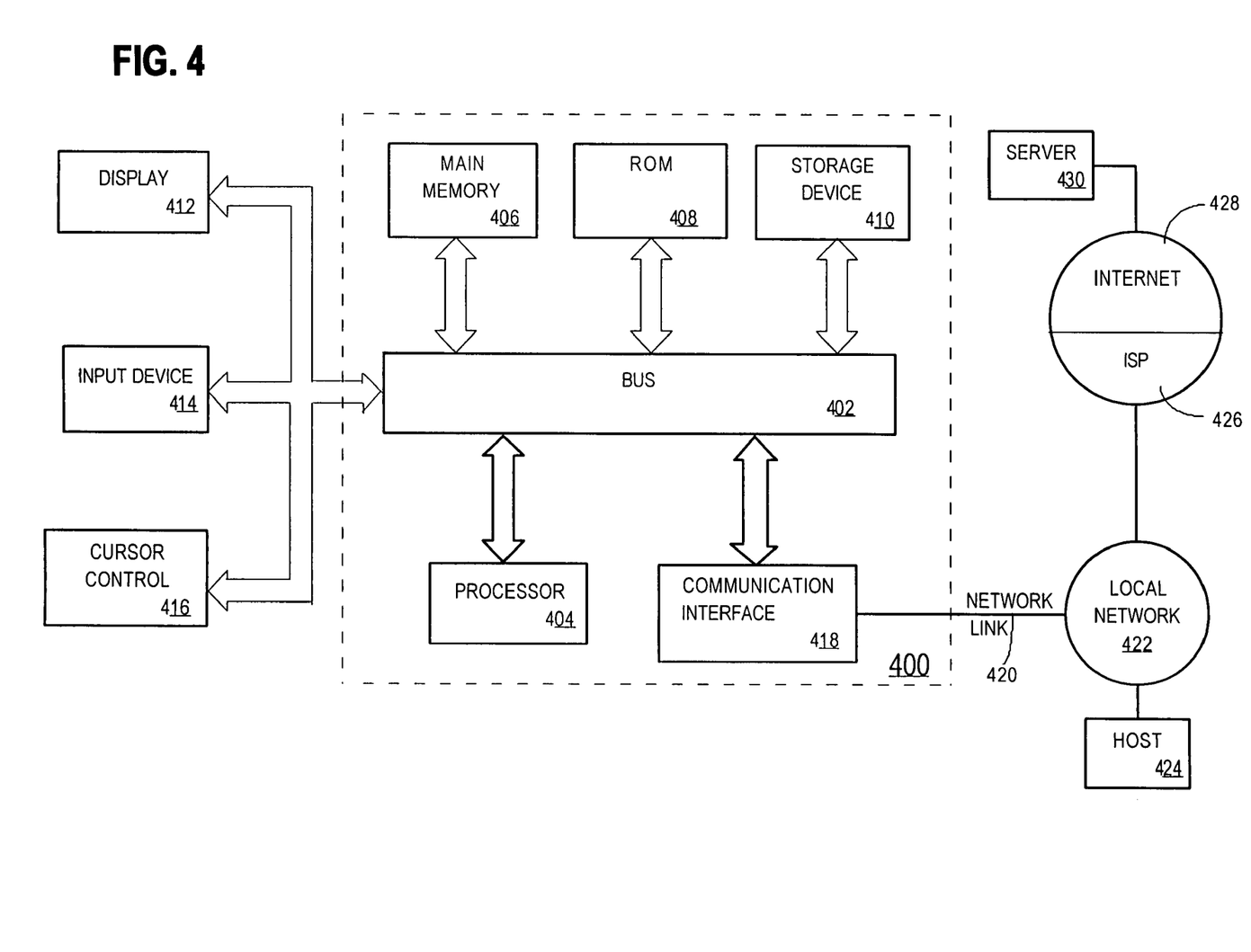
FIG. 4 is a block diagram that illustrates a computer system upon which an embodiment may be implemented.

FIG. 4 is a block diagram that illustrates a computer system 400 upon which an embodiment of the invention may be implemented. Computer system 400 includes a bus 402 or other communication mechanism for communicating information, and a processor 404 coupled with bus 402 for processing information. Computer system 400 also includes a main memory 406, such as a random access memory ("RAM") or other dynamic storage device, coupled to bus 402 for storing information and instructions to be executed by processor 404. Main memory 406 also may be used for storing temporary variables or other intermediate information during execution of instructions to be executed by processor 404. Computer system 400 further includes a read only memory ("ROM") 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube ("CRT"), for displaying information to a computer user. An input device 414, including alphanumeric and other keys, is coupled to bus 402 for communicating information and command selections to processor 404. Another type of user input device is cursor control 416, such as a mouse, trackball, stylus, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

The invention is related to the use of computer system 400 for using an RBAC system on a network. According to one embodiment of the invention, a method for using an RBAC system on a network is provided by computer system 400 in response to processor 404 executing one or more sequences of one or more instructions contained in main memory 406. Such instructions may be read into main memory 406 from another computer-readable medium, such as storage device 410. Execution of the sequences of instructions contained in main memory 406 causes processor 404 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 404 for execution. Such a medium may take many forms, including but not limited to, non-volatile media, and volatile media. Non-volatile media includes, for example, optical or magnetic disks, such as storage device 410. Volatile media includes dynamic memory, such as main memory 406.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, or any other medium from which a computer can read.

Various forms of computer readable media may be involved in carrying one or more sequences of one or more instructions to processor 404 for execution. For example, the instructions may initially be carried on a magnetic disk of a remote computer. The remote computer can load the instructions into its dynamic memory and send the instructions over a telephone line using a modem. A modem local to computer system 400 can receive the data on the telephone line and use an infrared transmitter to convert the data to an infrared signal. An infrared detector can receive the data carried in the infrared signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network ("ISDN") card or a modem to provide a data communication connection to a corresponding type of telephone line. As another example, communication interface 418 may be a local area network ("LAN") card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider ("ISP") 426. ISP 426 in turn provides data communication services through the worldwide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are exemplary forms of carrier waves transporting the information.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418. In accordance with the invention, one such downloaded application provides for using an RBAC system on a network as described herein.

The received code may be executed by processor 404 as it is received, and/or stored in storage device 410, or other non-volatile storage for later execution. In this manner, computer system 400 may obtain application code in the form of a carrier wave.

6.0 EXTENSIONS AND ALTERNATIVES

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method for using a role based access control system on a network, the method comprising the computer-implemented steps of:
    detecting that a user has initiated, during a network session, an operation to be performed requiring a resource provided on the network;
    identifying a condition specified from the user initiating the operation;
    wherein the condition is that the user must be assigned a particular conditional role, which is mutually exclusive with at least one other role already assigned to the user, to perform the operation requiring the resource;
    determining, based on the condition, whether the particular conditional role is to be assigned to the user during the network session, the particular conditional role defining a set of one or more privileges for a class of users on the network, the set of one or more privileges comprising a privilege required to perform the operation; and
    in the same network session, dynamically assigning to the user in response to the detecting and determining, the particular conditional role from a plurality of otherwise mutually exclusive roles that the user is allowed to mutually occupy if the condition is satisfied.

2. A method as recited in claim 1, wherein the step of identifying a condition includes identifying an object associated with the operation that is to be performed.

3. A method as recited in claim 1, further comprising the step of:
    identifying an existing role assigned to the user when the network session is in progress, the existing role defining at least some of the privileges of the user, wherein the existing role is mutually exclusive with the conditional role; and wherein the step of determining whether the particular conditional role is to be assigned to the user includes assigning the particular conditional role to the user in addition to the existing role that is already assigned to the user.

4. A method as recited in claim 1, wherein the determining whether the particular conditional role is to be assigned to the user includes determining that the particular conditional role is not to be assigned to the user.

5. A method as recited in claim 1, further comprising the step of assigning the particular conditional role to the user in response to making the determination that the particular conditional role is to be assigned to the user.

6. A method as recited in claim 1, further comprising the step of selectively permitting the operation to be performed in response to the determining that the particular conditional role is to be assigned to the user and otherwise blocking the operation.

7. A method as recited in claim 1, further comprising the step of precluding the operation from being performed in response to making the determination that the particular conditional role is to not be assigned to the user.

8. A method for using a role based access control system on a network, the method comprising the computer-implemented steps of:
   detecting that a user has initiated, during a network session, an operation to be performed, the operation requiring a resource provided on the network;
   identifying whether a set of one or more rules are designated for the user the operation;
   determining whether a user can mutually occupy at least
      (i) a first role assigned to the user when the user initiates the operation, and
      (ii) a second role required to perform the operation that is not assigned to the user when the user initiates the operation wherein the first role and the second role are designated to be mutually exclusive of one another unless the determination is that the set of one or more rules allow for the user to mutually occupy the first role and the second role when performing the operation; and
   in the same network session, dynamically assigning to the user in response to the detecting and determining, at least one conditional role from the plurality of otherwise mutually exclusive roles that the user is allowed to mutually occupy if the condition is satisfied;
   wherein the condition is that the user must be assigned a particular conditional role, which is mutually exclusive with at least one other role already assigned to the user, to perform the operation requiring the resource.

9. A method as recited in claim 8, wherein identifying a set of rules designated for the user includes identifying one or more conditions from the user initiating the operation on the network.

10. A method as recited in claim 8, further comprising the step of assigning the user the second role if the determination is that the first role and the second role can be mutually occupied by the user when performing the operation.

11. A method as recited in claim 8, further comprising the step of precluding the user from performing the operation if the determination is that the first role and the second role cannot be mutually occupied by the user.

12. A method as recited in claim 8, further comprising assigning the first role to the user when the user initiates a request to access resources on the network.

13. A method as recited in claim 8, wherein the determining comprises identifying one or more conditions from the user initiating the operation, and correlating the one or more conditions to one or more rules in the set of one or more rules.

14. A method as recited in claim 8, wherein the determining comprises identifying one or more objects from the user initiating the operation, and correlating the one or more objects to one or more rules in the set of one or more rules.

15. A method as recited in claim 8, wherein the method is performed on an administrative policy engine and wherein the determining comprises:
   identifying one or more business objects from the user initiating the operation; and
   correlating the one or more business objects to one or more rules in the set of rules using a rules processor that is internal to the administrative policy engine.

16. A method as recited in claim 8, wherein the method is performed on an administrative policy engine, and wherein the determining comprises:
   identifying one or more business objects from the user initiating the operation; and
   correlating the one or more business objects to one or more rules in the set of rules using a rules processor that is provided as a plug-in module to the policy engine.

17. A method for using a role based access control system on a network, the method comprising the computer-implemented steps of:
   detecting that a user has initiated, during a network session, an operation to be performed, the operation requiring a resource provided on the network;
   designating a set of conditions that may be identified from the user initiating the operation to be performed using resources provided on the network;
   wherein the set of conditions includes a condition that the user must be assigned a particular conditional role, which is mutually exclusive with at least one other role already assigned to the user, to perform the operation requiring the resource;
   determining at least one of a plurality of roles that the user may conditionally occupy by correlating at least one of the conditions in the set of conditions that are identifiable from the user initiating the operation with the roles that include instructions for controlling access to resources on the network, wherein determining the roles comprises determining, based on the one or more conditions occurring, whether the user can mutually occupy at least
      (i) a first role assigned to the user prior to the user initiating the operation, and
      (ii) a second role required to perform the operation wherein the first role and the second role are designated to be mutually exclusive of one another unless the determination is that the user to mutually occupy the first role and the second role when performing the operation; and
   in the same network session, dynamically assigning to the user in response to the detecting and determining, at least one conditional role from the plurality of otherwise mutually exclusive roles that the user is allowed to mutually occupy if the condition is satisfied.

18. A method as recited in claim 17, wherein the designating, determining and dynamically assigning steps of the method are performed prior to the user initiating the operation.

19. A method as recited in claim 17, wherein the step of determining one or more roles is at least partially performed during a network session after the user has been assigned the first role.

20. A method as recited in claim 17, further comprising determining that the user can occupy the first role, but not the second role, in response to identifying a particular condition from the set of conditions.

21. A method as recited in claim 17, further comprising the steps of:
  determining that the user can occupy the first role, but not the second role, in response to identifying a particular condition from the set of conditions when the user initiates the operation; and
  precluding the user from completing the operation in response to determining that the user can occupy the first role, but not the second role.

22. A method as recited in claim 17, further comprising the steps of:
  determining that the user can mutually occupy the first role and the second role, in response to identifying a particular condition from the set of conditions when the user initiates the operation; and
  selectively permitting the user to complete the operation in response to determining that the user can occupy the first role and the second role and otherwise blocking the operation.

23. A method as recited in claim 17, further comprising transferring instructions for performing at least a portion of the step of determining one or more roles from an administrative policy engine to another computer system where one or more resources that are to be accessed by the user when performing the operation are managed.

24. A method as recited in claim 17, further comprising transferring instructions for performing at least a portion of the step of determining one or more roles from an administrative policy engine to a terminal of the user.

25. A computer readable storage medium carrying instructions that, when executed by one or more processors, cause the one or more processors to perform the steps of:
  detecting that a user has initiated, during a network session, an operation to be performed, the operation requiring a resource provided on the network;
  designating a set of conditions that may be identified from a user initiating an operation to be performed using resources provided on the network;
  wherein the set of conditions includes a condition that the user must be assigned a particular conditional role, which is mutually exclusive with at least one other role already assigned to the user, to perform the operation requiring the resource; and
  determining one or more roles that the user may conditionally occupy by correlating one or more conditions in the set of conditions that are identifiable from the user initiating the operation with the one or more roles in a set of roles that control access to resources on the network, wherein the determining the one or more roles comprises determining, based on the one or more conditions occurring, whether the user can mutually occupy at least
    (i) a first role assigned to the user prior to the user initiating the operation, and
    (ii) a second role required to perform the operation wherein the first role and the second role are designated to be mutually exclusive of one another unless the determination is that the user to mutually occupy the first role and the second role when performing the operation; and
  in the same network session, dynamically assigning to the user based on the detecting and determining, at least one conditional role from the plurality of otherwise mutually exclusive roles that the user is allowed to mutually occupy if the condition is satisfied.

26. A computer system for using a role based access control system on a network, the computer system comprising an apparatus having one or more processors and comprising:
  means for designating a set of conditions that may be identified from a user initiating, during a network session, an operation to be performed using resources provided on the network;
  wherein the set of conditions includes a condition that the user must be assigned a particular conditional role, which is mutually exclusive with at least one other role already assigned to the user, to perform the operation requiring the resource; and
  means for determining one or more roles that the user may conditionally occupy with correlation of one or more conditions in the set of conditions that are identifiable from the user initiating the operation with the one or more roles in a set of roles that control access to resources on the network, wherein the means for determining the one or more roles includes means for determining, based on the one or more conditions occurring, whether the user can mutually occupy at least
    (i) a first role assigned to the user prior to the user initiating the operation, and
    (ii) a second role required to perform the operation, wherein the first role and the second role are designated to be mutually exclusive of one another unless the determination is that the user to mutually occupy the first role and the second role when performing the operation; and
  means for in the same network session, dynamically assigning to the user, in response to functions performed with the detecting means and the determining means, at least one conditional role from the plurality of otherwise mutually exclusive roles that the user is allowed to mutually occupy if the condition is satisfied.

27. A computer system for using a role based access control system on a network, the computer system comprising:
  a bus;
  a communication interface coupled to the bus for linking the computer system to the network; and
  a processor coupled to the bus, wherein the processor is configured for:
    detecting that a user has initiated, during a network session, an operation to be performed, the operation requiring a resource provided on the network;
    designating a set of conditions that may be identified from a user initiating an operation to be performed using resources provided on the network;
  wherein the set of conditions includes a condition is that the user must be assigned a particular conditional role, which is mutually exclusive with at least one other role already assigned to the user, to perform the operation requiring the resource;
  determining one or more roles that the user may conditionally occupy by correlating one or more conditions in the set of conditions that are identifiable from the user initiating the operation with the one or more roles in a set of roles that control access to resources on the network, wherein the processor determines the one or more roles with a correlation that is, based on the one or more conditions occurring, whether the user can mutually occupy at least (i) a first role assigned to the user prior to the user initiating the operation, and (ii) a second role required to perform the operation, wherein the first role and the second role are designated to be mutually exclusive of one another unless the determination is that the user to mutually occupy the first role and the second role when performing the operation; and in the same network session, dynamically assigning to the user, in response to the detecting and determining at least one conditional role from the plurality of otherwise mutually exclusive roles that the user is allowed to mutually occupy if the condition is satisfied.

28. The system as recited in claim 27 wherein the processor designation of a set of conditions comprises identifying an object associated with the operation that is to be performed.

29. The system as recited in claim 27, wherein the processor further identifies an existing role assigned to the user when a network session is in progress, the existing role defining at least some of the privileges of the user, wherein the existing role is mutually exclusive with the conditional role; and wherein the processor determines whether the conditional role is to be assigned to the user with an assignment of the conditional role to the user in addition to the existing role that is already assigned to the user.

30. The system as recited in claim 27, wherein the processor determining whether a conditional role is to be assigned to the user comprises determining that the conditional role is not to be assigned to the user.

31. The system as recited in claim 27, wherein the processor further assigns the conditional role to the user in response to determining that the conditional role is to be assigned to the user.

32. The system as recited in claim 27 wherein the processor further selectively permits the operation to be performed in response to the determining that the conditional role is to be assigned to the user and otherwise blocks the operation.

33. The system as recited in claim 27, wherein the processor further precludes performance of the operation in response to determining that the conditional role is to not be assigned to the user.

34. The system as recited in claim 26 wherein the designating means comprise means for identifying an object associated with the operation that is to be performed.

35. The system as recited in claim 26, further comprising means for identifying an existing role assigned to the user when the network session is in progress, the existing role defining at least some of the privileges of the user, wherein the existing role is mutually exclusive with the conditional role; and wherein determining means comprise means for assigning the conditional role to the user in addition to the existing role that is already assigned to the user.

36. The system as recited in claim 26, wherein the determining means comprise means for determining that the conditional role is not to be assigned to the user.

37. The system as recited in claim 26, further comprising means for assigning the conditional role to the user in response to determining that the conditional role is to be assigned to the user.

38. The system as recited in claim 26, further comprising means for selectively permitting the operation to be performed in response to determining that the conditional role is to be assigned to the user and otherwise blocking the operation.

39. The system as recited in claim 26, further comprising means for precluding the operation from being performed in response to determining that the conditional role is to not be assigned to the user.

* * * * *